(12) United States Patent
Knotowicz et al.

(10) Patent No.: US 12,280,621 B2
(45) Date of Patent: Apr. 22, 2025

(54) HOLLOW TIRE AND METHOD OF MAKING SAME

(71) Applicant: Superior Tire and Rubber Corp., Warren, PA (US)

(72) Inventors: Kyle Robert Knotowicz, Jamestown, NY (US); Joseph J. Peterson, Warren, PA (US)

(73) Assignee: Superior Tire and Rubber Corp., Warren, PA (US)

( * ) Notice: Subject to any disclaimer, the term of this patent is extended or adjusted under 35 U.S.C. 154(b) by 1173 days.

(21) Appl. No.: 16/511,967

(22) Filed: Jul. 15, 2019

(65) Prior Publication Data

US 2020/0016933 A1 Jan. 16, 2020

Related U.S. Application Data

(60) Provisional application No. 62/698,519, filed on Jul. 16, 2018.

(51) Int. Cl.

| | | |
|---|---|---|
| A01C 5/06 | (2006.01) | |
| A01C 7/20 | (2006.01) | |
| B29C 41/04 | (2006.01) | |
| B29C 41/06 | (2006.01) | |
| B60C 3/02 | (2006.01) | |
| B60C 3/06 | (2006.01) | |
| B60C 7/12 | (2006.01) | |
| B60C 1/00 | (2006.01) | |
| B60C 7/00 | (2006.01) | |

(52) U.S. Cl.
CPC .............. *B60C 7/125* (2013.01); *A01C 5/064* (2013.01); *A01C 5/068* (2013.01); *A01C 7/203* (2013.01); *B29C 41/04* (2013.01); *B29C 41/06* (2013.01); *B60C 3/02* (2013.01); *B60C 3/06* (2013.01); *B60C 2001/0091* (2013.01); *B60C 2007/005* (2013.01); *B60C 2200/08* (2013.01)

(58) Field of Classification Search
None
See application file for complete search history.

(56) References Cited

U.S. PATENT DOCUMENTS

| | | |
|---|---|---|
| 2,978,277 A | 4/1961 | Gaudry |
| 3,450,182 A | 6/1969 | Verdier |
| 3,470,433 A | 9/1969 | Siefert |
| 3,977,453 A | 8/1976 | Coran et al. |
| 4,049,767 A | 9/1977 | Vaidya |
| 4,430,952 A | 2/1984 | Murray |
| 4,449,756 A | 5/1984 | Weeks |
| 4,493,274 A | 1/1985 | Robinson, Jr. et al. |

(Continued)

FOREIGN PATENT DOCUMENTS

| | | | |
|---|---|---|---|
| EP | 0 076 412 A2 | * | 4/1983 |
| EP | 1 238 824 A1 | * | 9/2002 |

OTHER PUBLICATIONS

English machine translation of EP 76 412 A2, Apr. 13, 1982.*

*Primary Examiner* — Adrienne C. Johnstone
(74) *Attorney, Agent, or Firm* — Boardman & Clark LLP

(57) ABSTRACT

A tire comprising a continuous channel defined by spaced apart sidewalls coupled at a first end to a bridging member and at a second end to a contact member that is coupled to a disc contact portion, said tire being formed by rotational molding of a polyurethane and configured for mounting on a wheel rim.

10 Claims, 7 Drawing Sheets

(56) References Cited

U.S. PATENT DOCUMENTS

| | | |
|---|---|---|
| 4,733,730 A | 3/1988 | Murray |
| 4,760,806 A * | 8/1988 | Bigbee .................. A01C 5/064 |
| | | 111/167 |
| 4,802,519 A | 2/1989 | Moranz |
| 4,998,980 A | 3/1991 | Katou |
| 5,167,439 A | 12/1992 | Green et al. |
| 5,343,916 A | 9/1994 | Duddey et al. |
| 5,460,213 A | 10/1995 | Pajtas |
| 5,533,793 A | 7/1996 | Walker |
| 5,887,664 A | 3/1999 | Whalen et al. |
| 6,102,091 A | 8/2000 | Peterson et al. |
| 6,227,622 B1 | 5/2001 | Roderick et al. |
| 6,463,972 B1 | 10/2002 | Lacour |
| 6,644,223 B2 | 11/2003 | Prairie et al. |
| 6,820,669 B2 | 11/2004 | Hodges et al. |
| 6,845,796 B2 | 1/2005 | Katoh et al. |
| 7,128,110 B2 | 10/2006 | Yamazaki et al. |
| 7,481,278 B1 | 1/2009 | Pomedli et al. |
| 7,481,498 B1 | 1/2009 | Morris |
| 8,037,911 B2 | 10/2011 | Morris |
| 8,544,516 B2 | 10/2013 | Mariman et al. |
| 9,643,454 B2 | 5/2017 | Kumar et al. |
| 2003/0024622 A1 | 2/2003 | Chrobak |
| 2004/0089209 A1 | 5/2004 | Joaquin Romagnoli |
| 2005/0218712 A1 | 10/2005 | Beaumier |
| 2010/0251947 A1 | 10/2010 | Mariman et al. |
| 2014/0305561 A1 * | 10/2014 | Phely .................. B60C 3/02 |
| | | 152/453 |
| 2014/0319899 A1 | 10/2014 | Colon |
| 2015/0122386 A1 | 5/2015 | Kumar et al. |
| 2016/0114623 A1 | 4/2016 | Smith et al. |
| 2016/0128266 A1 * | 5/2016 | Phely .................. B60C 3/06 |
| 2018/0134084 A1 * | 5/2018 | Seljan |
| 2019/0016176 A1 * | 1/2019 | Johnson |
| 2020/0254820 A1 * | 8/2020 | Gallagher .................. B60C 7/12 |

* cited by examiner

HOLLOW TIRE AND METHOD OF MAKING SAME

CROSS-REFERENCE TO RELATED APPLICATIONS

This application claims priority to U.S. Provisional Patent Application No. 62/698,519 filed on Jul. 16, 2018, the entirety of which is incorporated herein in its entirety by reference.

BACKGROUND

The present disclosure relates to the field of tires and wheels. More specifically, the present disclosure relates to hollow tires and wheels, including tires and wheels for planting and agricultural equipment and implements.

Tires for wheels are generally known in the art. A tire is a ring or annular-shaped covering that fits around a wheel to help protect the wheel and enhance wheel and overall machine or vehicle performance.

Tires for use with planting equipment are also known. These tires improve certain performance characteristics. More specifically, in "no-till" planting equipment, gauge or seeder tires and wheels are used, for example, to help ensure a seed is planted at the correct depth. Such seeder tires are generally provided on narrow gauge wheels.

Referring to FIG. 1, an example of a portion of prior art no-till planting equipment is illustrated. More specifically, an example of a portion of a prior art no-till planting apparatus 100 using a seeder wheel 102 is illustrated. Planting equipment 100 includes a planter arm 104. An opener gauge wheel or disc or knife 106 may be coupled to planter arm 104. Disc or knife 106 is provided to engage and open soil, creating a furrow for the receipt of seeds, seedlings, or other plants to be planted by no-till planting equipment 100. Planter arm 104 may also include a pressure adjustment arm 108 for adjusting the down pressure in which disc or knife 106 may engage soil to generate consistent seed placement.

A seed firming wheel 110 may optionally be coupled to planter arm 104. Seed firming wheel 110 may be configured to gently pack a seed, seedling, or other plant to be planted at the bottom of the furrow created by disc or knife 106. A packer wheel 112 may be coupled to planter arm 104 in order to help close the furrow after seed placement. A depth control assembly 114 may be coupled to planter arm 104 and provided to make depth adjustments to seeding depth.

A scraper 116 may be provided on a first side 118 of disc 106. Scraper 116 may be coupled to planter arm 104 and be provided to protect against plugging, while additionally acting as a seed boot, creating a shelf for accurate seed placement in the furrow. Seeder wheel 102 may be provided on a second side 120 of disc 106. Seeder wheel 102 carries a known seeder tire 122 which engages or rolls over the soil or ground. In addition, seeder tire 122 contacts second side 120 of disc or knife 106, creating a cleaning action to facilitate removal of debris deposited on disc 106 (e.g., during planting operations). Known seeder tire 122 is a solid tire.

Due to requirements during no-till planting, typical traditional commercial gauge or seeder tires are solid tires. This is largely due to wear requirements of such tires in no-till planting equipment. For example, gauge or seeder tire 122 generally has to withstand abrasive wear as it rides against metal disc or knife 106 configured to create channels or furrows for the receipt of seeds. As indicated above, gauge or seeder tire 122 typically also has a secondary functionality of wiping or cleaning material (e.g., dirt, mud or debris) buildup on metal disc or knife 106 during no-till planting.

Gauge and seeder tire 122 is also subject to toughness and coarseness of crop stubble, often due to genetic modification. Therefore, tire 122 is typically solid to withstand greater cut and tear conditions, as solid tires are known to tolerate or withstand such conditions.

However, solid tires have certain disadvantages when used in connection with planting and agricultural equipment. For example, solid tires are unable to absorb irregularities in the ground over which the solid tire travels. Instead, solid tires experience a reactionary force in a direction other than the direction of travel. This results in transfer of force throughout the planting or agricultural equipment caused by irregularities in the ground. This may lead to wear and/or damage of the planting or agricultural equipment.

In no-till planting equipment, this may also lead to a seed being planted at an incorrect depth. In addition, solid tires require more material due to the solid nature of the tire, which also increases tire mass and associated weight.

Accordingly, hollow tires are also used. A known hollow channel tire 201 is illustrated in FIGS. 2-4 and disclosed in U.S. Pat. No. 9,643,454, the entirety of which is incorporated herein by reference. Such a hollow channel tire 201 can better absorb irregularities in the ground compared to solid tires, thereby better avoiding equipment damage, and leading to more consistent seed planting depth. In addition, such a hollow channel gauge or seeder tire 201 tends to be lighter and require less material. In addition, such a known hollow channel tire 201 also tends to provide improved deflection on the tire crown in the radial direction, which can be advantageous over solid tires in effectively "slinging" mud, dirt and debris from tire 201 during use (e.g., in muddy or less than ideal weather conditions for seeding).

Seeder wheel 123 carries seeder tire 201. Seeder tire 201 assists in the removal or cleaning of disc or knife 106 by facilitating removal of debris deposited on disc or knife 106 (e.g., during operation or, more specifically, planting operation).

FIGS. 3-4 further illustrate known seeder tire 201. Known seeder tire 201 includes or defines a hollow, open channel 203 provided within seeder tire 201. Hollow channel 203 is defined by a first sidewall 205 separated or spaced from a second sidewall 207 by a contact area 209. Contact area 209 or more specifically, a contact surface 215 of contact area 209, is provided to contact the ground, soil, or other surface over which seeder tire 201 rolls or is adapted or configured to roll. Opposing mounting rims 211a, 211b may be respectively connected to first sidewall 205 and second sidewall 207 to facilitate mounting upon a wheel rim.

Hollow channel 203 advantageously reduces tire mass, and reduces the amount of material necessary to manufacture the tire, relative to known solid tires. The lighter, reduced mass structure also advantageously offers ease of handling and reduced tractor loading.

A disc contact portion 217 may include an amount of tire material which extends approximately perpendicular to and projects away from second sidewall 207 and/or from hollow channel 203.

Referring again to FIG. 2, disc contact portion 217 is adapted or configured to contact or nearly contact disc or knife 106 of no-till seeder 100. Thus, as seeder tire 201 rolls, disc or knife contact portion 217 provides a wiping or cleaning of material buildup on disc or knife 106 (e.g., during planting).

SUMMARY

It has been determined that known hollow channel designs may offer or provide less than optimal deflection between sidewalls 205, 207, and/or the mounting rims 211a, 211b, in the lateral direction. Less than optimal deflection can cause potential issues. For example, such less than optimal deflection can lead to insufficient pressure or even separation of the tire from the metal disc, allowing mud, dirt or debris to build up on the disc. In addition, such deflection can cause gapping between the tire and the wheel rim to which it is mounted, allowing debris, dirt, moisture, etc. to enter the hollow channel cavity of the tire. While a solid tire could help resolve some or all of these deflection and debris issues, as discussed above, the solid tire has its own shortcomings as it does not allow for optimal radial deflection on the crown of the tire, requires more material, etc.

There is a need for a seeder or gauge tire design that allows for more optimal crown deflection for seeding when the wheel is compressed against the ground, and offers material savings and reduced weight, while providing improved rigidity between the sidewalls and/or more optimal sidewall strength during use to reduce unwanted lateral deflection, as well as more optimal puncture resistance. There is also a need for a tire design that helps prevent elements such as mud, debris, and moisture from entering hollow channel of the tire. There is also a need for a simple design that does not require secondary operations during manufacturing to produce or assemble the tire with, for example, many components, fasteners, or tools.

Accordingly, a tire design is disclosed which has more optimal crown deflection for seeding but reduced lateral deflection when the wheel is compressed against the ground. In various embodiments, the tire includes a hollow design for material savings and reduced weight, while providing improved rigidity between the sidewalls, more optimal sidewall strength during use, and/or preventing dirt, debris, moisture, etc. from entering hollow channel of the tire. In addition, the tire offers more optimal puncture resistance and may be manufactured without unnecessary or unacceptable secondary manufacturing operations.

Accordingly, the present disclosure provides a tire comprising: a first sidewall spaced apart from a second sidewall, whereby the first side wall has a base portion and an opposing end and the second side wall has a base portion and an opposing end; a contact member extending from the opposing end of the first sidewall to the opposing end of the second sidewall; a bridging member extending from the base portion of the first sidewall to the base portion of the second sidewall; and a disc contact portion extending outwardly away from the contact member and/or second side wall; whereby the sidewalls, contact member and bridging member define a hollow channel; and whereby the tire is made of one or more urethane compounds.

Accordingly, the present disclosure further provides a tire comprising a continuous channel tire defined by a bridging member, spaced apart sidewalls, and a contact member coupled to a disc contact portion, said tire being formed by rotational molding of a urethane and configured for mounting on a wheel rim.

Accordingly, the present disclosure further provides a tire comprising spaced apart sidewalls coupled at a first end to a bridging member and at a second end to a contact member coupled to a disc contact portion, said tire having a homogeneous one-piece construction.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figure 1:
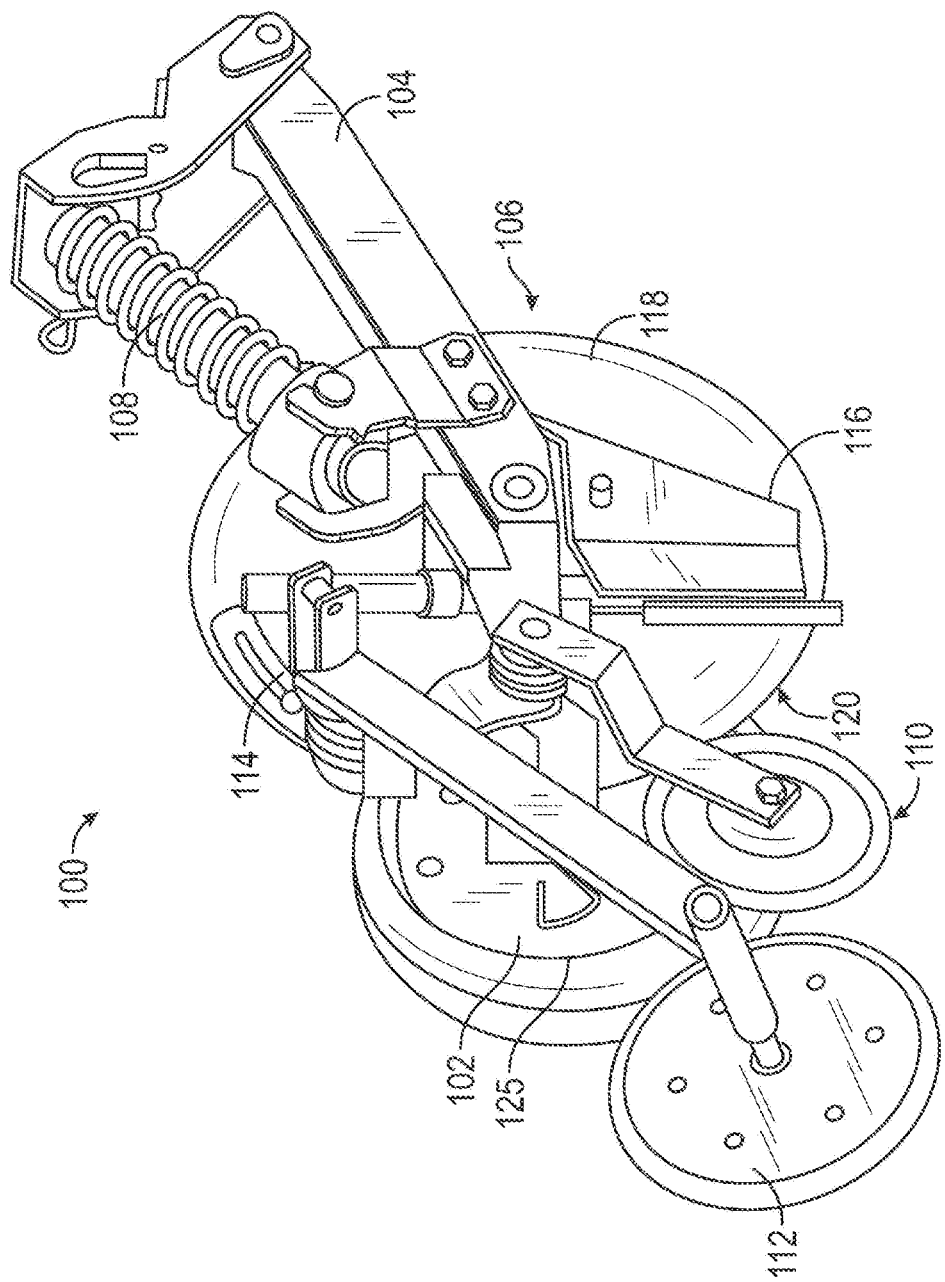
FIG. 1 is an isometric view of an example of a portion of a known no-till planter which includes a known solid seeder tire.
Figure 2:
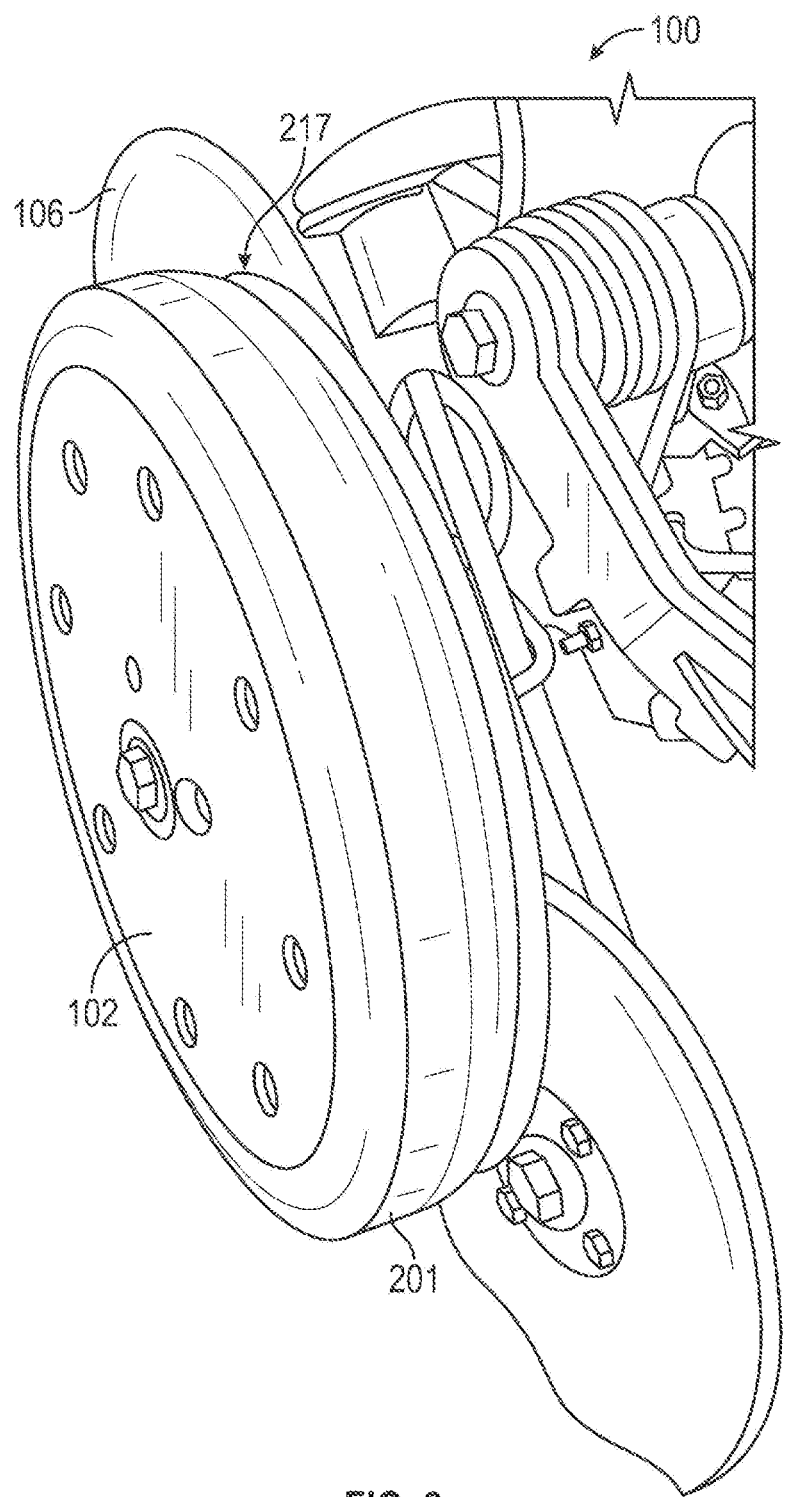
FIG. 2 is an isometric view of an example of a portion of a known no-till planter carrying a seeder wheel, the seeder wheel having a known hollow channel seeder tire.
Figure 3:
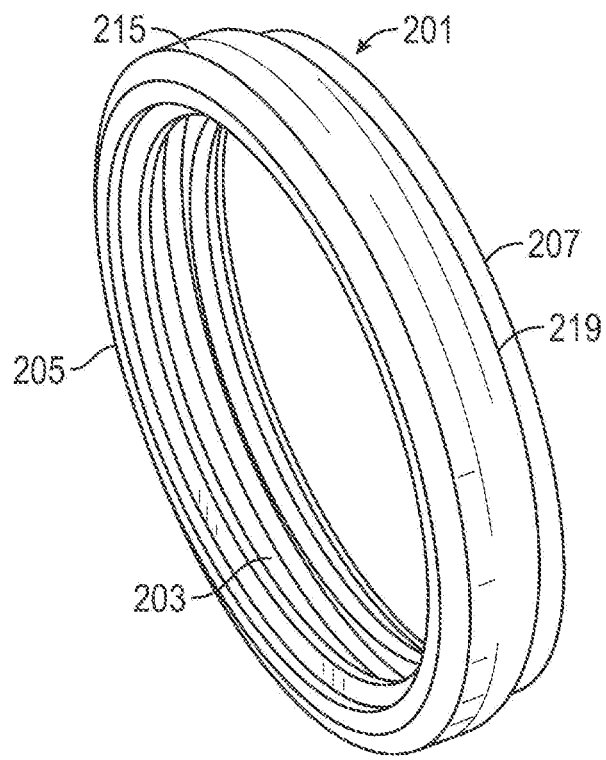
FIG. 3 is an isometric view of the known seeder tire illustrated in FIG. 2.
Figure 4:
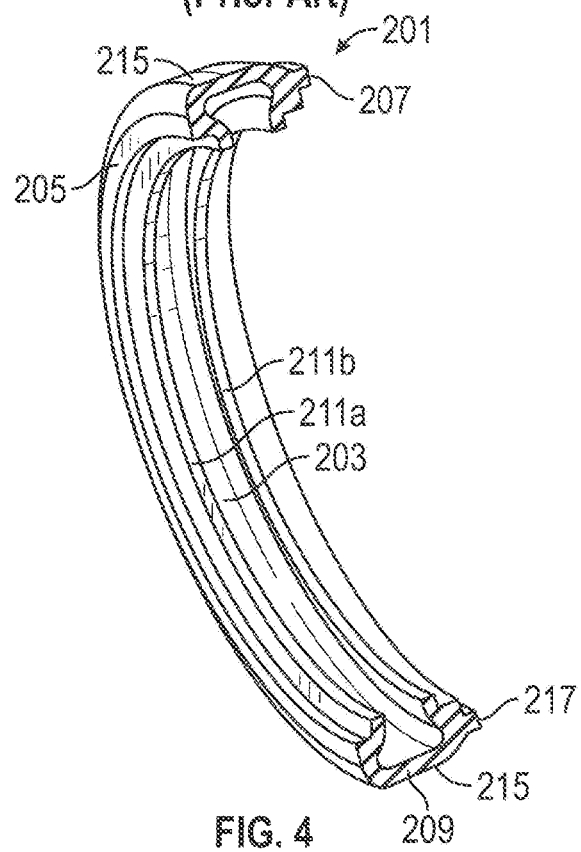
FIG. 4 is an isometric view of a cross-section of the known seeder tire of FIG. 3.
Figure 5:
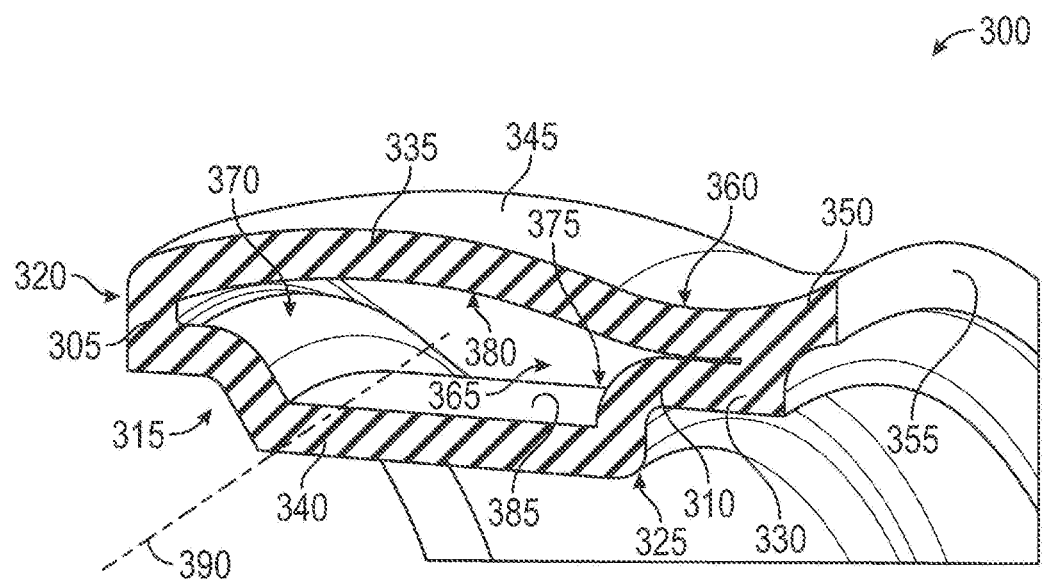
FIG. 5 is a cross-sectional isometric view of a seeder tire, according to one or more various examples of embodiments.
Figure 6:
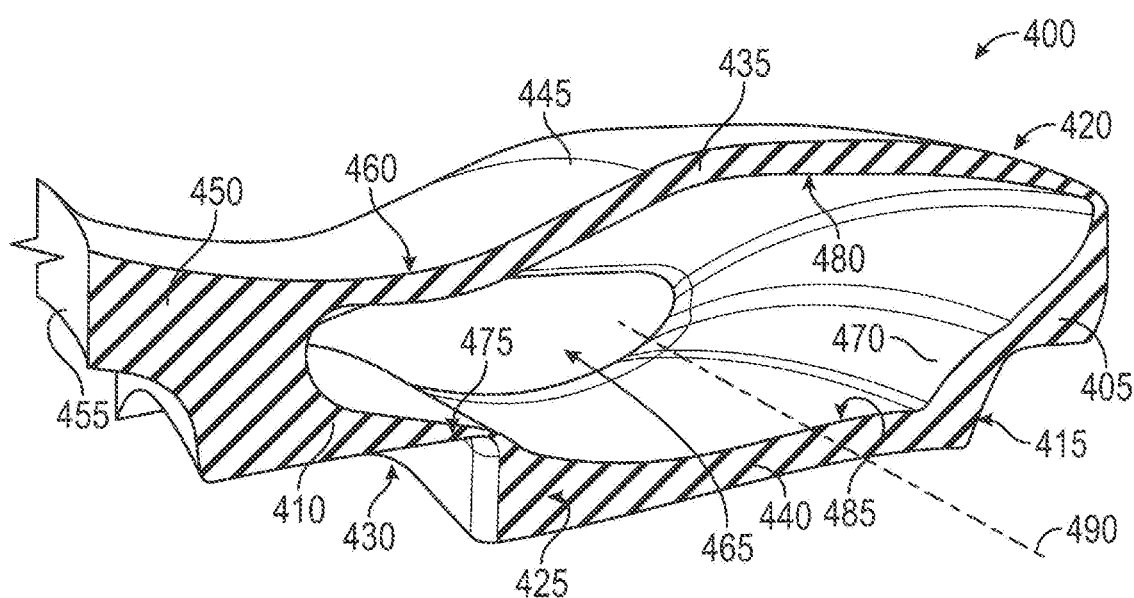
FIG. 6 is a cross-sectional perspective view of a seeder tire, according to one or more various examples of embodiments.

Referring to FIGS. 5-6, various embodiments of a gauge or seeder tire for use on a gauge or seeder wheel in planting equipment, including no-till planting equipment, is disclosed. While the disclosure may specifically reference no-till planting equipment, however, it should be appreciated that the seeder tire may be used in association with other equipment, including other planting and agricultural equipment.

It should also be appreciated that, while seeder tires are disclosed in greater detail herein, the tires and methods disclosed herein have broader applications and could be applied to other special, narrow gauge and/or small size tires such as rally tires, motorcycle tires, bicycle tires, fork lift tires, wheel chair tires, and the like, or larger tires including tires for passenger cars, trucks, buses and the like.

Referring more specifically to FIG. 5, a seeder tire 300 (e.g., semi-pneumatic seeder tire) is provided according to various examples of embodiments. In various embodiments, seeder tire 300 includes a first sidewall 305 and a second sidewall 310. In various embodiments, first sidewall 305 includes a base portion 315 and an opposing end 320, and first sidewall 305 includes an L-shaped cross-section between base portion 315 and opposing end 320. In various embodiments, second sidewall 310 includes a base portion 325 and an opposing end 330, and second sidewall 310 includes an L-shaped cross-section between base portion 325 and opposing end 330. In various embodiments, opposing end 320 of first side wall 305 and opposing end 330 of second side wall 310 are connected or coupled by a contact member 335. In various embodiments, tire 300 is one piece or a single piece tire. In various embodiments, base portion 315 of first side wall 305 and base portion 325 of second side wall 310 are connected or coupled by a base or bridging member 340.

In various embodiments, contact member 335, or more specifically, a contact surface 345 of contact member 335, is provided to contact the ground, soil, or other surface over which seeder tire 300 rolls or is adapted or configured to roll. In various embodiments, contact member 335 is semi-circular in cross-section and extends, along with second sidewall 310, to a disc contact portion 350 adapted or configured to engage a planting disc and/or wipe or clean the disc while also increasing sidewall 310 abrasion resistance. Disc contact portion 350 may include a disc or knife contact surface 355. A tapered, scalloped, or contoured portion 360 may lead from contact member 335 to disc contact portion 350. The disclosed structure has various advantages, including better tire wear life, as tapered portion 360 may allow for a channel of buffer material during disc wiping or cleaning, delaying contact with other portions of tire 300.

In various embodiments, the seeder tire (and/or the sidewalls and bridging member) also includes a mounting or wall structure configured to allow for the tire to be mounted to a wheel rim, and more specifically a split-rim wheel.

Seeder tire 300, according to various embodiments, substantially self-defines a hollow tire structure, cavity, or channel 365. In various embodiments, seeder tire 300 is one-piece, and contact member 335, sidewalls 305, 310, and base member 340 substantially or fully define a self-enclosed or substantially self-enclosed hollow or mostly hollow cavity or channel 365.

In various embodiments, seeder tire 300 includes or defines self-enclosed or substantially self-enclosed hollow or mostly hollow channel 365 provided within seeder tire 300. In various embodiments, channel 365 is tubular. In various examples of embodiments, hollow channel 365 is a tube defined by first sidewall 305 separated or spaced from second sidewall 310 by contact member 335 and bridging member 340. Hollow channel 365 (and thermoset or thermoplastic polyurethane compound as discussed below) individually and collectively have various advantages, including reduced or more optimal tire 300 mass. The reduced or optimal tire mass leads to reduced cost, increased ease of handling, and reduced equipment loading.

Seeder tire 300, according to various embodiments, further includes contact member 335 cross-sectional length to sidewall 305, 310 cross-sectional height aspect ratio(s) ranging from about 3:2 to 5:1. The disclosed aspect ratio(s) increases tire wear life by reducing the concentration of tire stress when the seeder tire flexes, and reducing or avoiding stress points which can cause tire failure. Flexing of seeder tire 300 may occur due to contact of an irregularity in the ground over which seeder tire 300 rolls. Sidewalls 305, 310 also help maintain rigidity, further preventing tire 300 from collapsing when uneven terrain is encountered.

In various embodiments, tire 300 is a substantially self-supporting one-piece non-pneumatic hollow gauge tire defining a fully self-enclosed hollow or primarily hollow area 365 or tubular area separated or offset from outside surfaces, such as contact surface 340, with material having an offset thickness in range of at least 0.225 inches to 0.4 inches. In various embodiments, tire 300 has an offset thickness in range of at least 0.25 inches to 0.375 inches. In various embodiments, the tire has an offset thickness of at least approximately, or approximately, 0.3125 inches. Having an offset between hollow area 365 and outside surfaces of wheel 300 with the disclosed thickness prevents sidewall 305, 310 collapse by better optimizing sidewall 305, 310 stiffness. In various embodiments, base or bridging member 340 also helps provide more optimal sidewall stiffness. For example, base or bridging member 340 provides support between sidewalls 305, 310 (and/or base portion 315, 325 of sidewalls 305, 310) and prevents excess or undesired deflection between sidewalls 305, 310, and/or base portion 315, 325.

In various embodiments, hollow or tubular channel 365 includes a variable, tapering, or increasing channel width, distance or dimension between an inner surface 370 of first sidewall 305 and an inner surface 375 of second sidewall 310. More specifically, in various embodiments, the width of hollow channel 365 generally increases across channel 365 when traveling from bridging member 340, or from contact member 335, towards a central axis 390 of tire 300.

In various embodiments, hollow channel 365 includes a variable, tapering, or increasing channel height, distance, or dimension between an inner surface 380 of contact member 335 and inner surface 385 of base or bridging member 340. More specifically, in various embodiments, the height of hollow channel 365 generally increases across channel 365 when traveling from sidewalls 305, 310 toward central axis 390 of tire 300.

In various examples of embodiments, hollow channel 365 advantageously reduces tire 300 mass, and reduces the amount of material necessary to manufacture tire 300, relative to known solid tires, while providing improved rigidity and sidewall 305, 310 strength relative to known hollow channel tires without any bridging member. The lighter, reduced mass structure may also advantageously offer ease of handling and reduced tractor loading.

As discussed above, tapered or contoured portion 360 may be provided to connect or couple disc or knife contact surface 355 with contact member 335 and/or second sidewall 310. In various embodiments, an outside diameter of tire 300 at tapering portion 360 nearer contact area 335 is greater or larger than an outside diameter of tire 300 further from contact area 335 or toward disc or knife contact surface 355. Disc contact portion 350 may be provided on or near second sidewall 310 at an end portion of tapering portion 360 furthest from contact surface 345. In various embodiments, disc contact portion 350 includes an amount of tire material which extends or projects away from second sidewall 310. Further, in various embodiments, disc contact portion 350 projects away from hollow channel 365. In various embodiments, disc contact portion 350 and/or disc or knife contact surface 355 is adapted or configured to contact or nearly contact a disc or knife of a no-till seeder. Thus, in various embodiments, as seeder tire 300 rolls, disc or knife contact portion 350 and/or contact surface 335 provides a wiping or cleaning of material buildup on the disc or knife (e.g., during planting). In addition, it is not atypical for the tire material of disc contact portion 350 to wear away or decrease over a period of time of use, due to contact with the disc or knife or soil (e.g., during planting). Accordingly, in various embodiments, disc contact portion 350 is provided with sufficient material to allow for acceptable wear over time.

Hollow channel 365, bridging member 340, and contact member 335 thickness of tire 300 at or about contact surface 345 may help reduce stress points which could collapse, damage or otherwise modify tire 300 during its life or use, while helping maintain sufficient wear strength of the contact surface with the ground.

In various embodiments, and referring now to FIG. 6, a tire 400 (e.g., semi-pneumatic tire) having a self- or fully enclosed cavity 465 is manufactured and/or produced using a rotational molding process.

Referring more specifically to FIG. 5, a seeder tire 400 is provided according to various examples of embodiments. In various embodiments, seeder tire 400 includes a first sidewall 405 and a second sidewall 410. In various embodiments, first sidewall 405 includes a base portion 415 and an opposing end 420, and first sidewall 405 includes an L-shaped cross-section between base portion 415 and opposing end 420. In various embodiments, second sidewall 410 includes a base portion 425 and an opposing end 430, and second sidewall 410 includes an L-shaped cross-section between base portion 425 and opposing end 430. In various embodiments, opposing end 420 of first side wall 405 and opposing end 430 of second side wall 410 are connected or coupled by a contact member 435. In various embodiments, tire 400 is one piece or a single piece tire. In various embodiments, base portion 415 of first side wall 405 and base portion 425 of second side wall 410 are connected or coupled by a base or bridging member 440.

In various embodiments, contact member 435, or more specifically, a contact surface 445 of contact member 435, is provided to contact the ground, soil, or other surface over which seeder tire 400 rolls or is adapted or configured to roll. In various embodiments, contact member 435 is semicircular in cross-section and extends, along with second sidewall 410, to a disc contact portion 450 adapted or configured to engage a planting disc and/or wipe or clean the disc while also increasing sidewall 410 abrasion resistance. Disc contact portion 450 may include a disc or knife contact surface 455. A tapered, scalloped, or contoured portion 460 may lead from contact member 435 to disc contact portion 450. The disclosed structure has various advantages, including better tire wear life, as tapered portion 460 may allow for a channel of buffer material during disc wiping or cleaning, delaying contact with other portions of tire 400.

In various embodiments, the seeder tire (and/or the sidewalls and bridging member) also includes a mounting or wall structure configured to allow for the tire to be mounted to a wheel rim, and more specifically a split-rim wheel.

Seeder tire 400, according to various embodiments, substantially self-defines a hollow tire structure, cavity, or channel 465. In various embodiments, seeder tire 400 is one-piece, and contact member 435, sidewalls 405, 410, and base member 440 substantially or fully define a self-enclosed or substantially self-enclosed hollow or mostly hollow cavity or channel 465.

In various embodiments, seeder tire 400 includes or defines self-enclosed or substantially self-enclosed hollow or mostly hollow channel 465 provided within seeder tire 400. In various embodiments, channel 465 is tubular. In various examples of embodiments, hollow channel 465 is a tube defined by first sidewall 405 separated or spaced from second sidewall 410 by contact member 435 and bridging member 440. Hollow channel 465 (and thermoset and/or thermoplastic polyurethane compound as discussed below) individually and collectively have various advantages, including reduced or more optimal tire 400 mass. The reduced or optimal tire mass leads to reduced cost, increased ease of handling, and reduced equipment loading.

Seeder tire 400, according to various embodiments, further includes contact member 435 cross-sectional length to sidewall 405, 410 cross-sectional height aspect ratio(s) ranging from about 3:2 to 5:1. The disclosed aspect ratio(s) increases tire wear life by reducing the concentration of tire stress when the seeder tire flexes, and reducing or avoiding stress points which can cause tire failure. Flexing of seeder tire 400 may occur due to contact of an irregularity in the ground over which seeder tire 400 rolls. Sidewalls 405, 410 also help maintain rigidity, further preventing tire 400 from collapsing when uneven terrain is encountered.

In various embodiments, tire 400 is a substantially self-supporting one-piece non-pneumatic hollow gauge tire defining a fully self-enclosed hollow or primarily hollow area 465 or tubular area separated or offset from outside surfaces, such as contact surface 440, with material having an offset thickness in range of at least 0.225 inches to 0.4 inches. In various embodiments, tire 400 has an offset thickness in range of at least 0.25 inches to 0.375 inches. In various embodiments, the tire has an offset thickness of at least approximately, or approximately, 0.3125 inches. Having an offset and/or average between hollow area 465 and outside surfaces of wheel 400 with the disclosed thickness prevents sidewall 405, 410 collapse by better optimizing sidewall 405, 410 stiffness. In various embodiments, base or bridging member 440 also helps provide more optimal sidewall stiffness. For example, base or bridging member 440 provides support between sidewalls 405, 410 (and/or base portion 415, 425 of sidewalls 405, 410) and prevents excess or undesired deflection between sidewalls 405, 410, and/or base portions 415, 425.

In various embodiments, hollow or tubular channel 465 includes a variable, tapering, or increasing channel width, distance or dimension between an inner surface 470 of first sidewall 405 and an inner surface 475 of second sidewall 410. More specifically, in various embodiments, the width of hollow channel 465 generally increases across channel 465 when traveling from bridging member 440, or from contact member 435, towards a central axis 490 of tire 400.

In various embodiments, hollow channel 465 includes a variable, tapering, or increasing channel height, distance, or dimension between an inner surface 480 of contact member 435 and inner surface 485 of base or bridging member 440. More specifically, in various embodiments, the height of hollow channel 465 generally increases across channel 465 when traveling from sidewalls 405, 410 toward central axis 470 of tire 400.

In various examples of embodiments, hollow channel 465 advantageously reduces tire 400 mass, and reduces the amount of material necessary to manufacture tire 400, relative to known solid tires, while providing improved rigidity and sidewall 405, 410 strength relative to known hollow channel tires without any bridging member. The lighter, reduced mass structure may also advantageously offer ease of handling and reduced tractor loading.

It should be appreciated that the hollow channel does not need to be continuously or completely hollow. In various embodiments, hollow channel 365/465 is primarily or substantially hollow. In various examples of embodiments, it may also be broken up into multiple hollow sections by, for example, one or more gussets, walls, dividers, protrusions, ridges, etc.

As discussed above, tapered or contoured portion 460 may be provided to connect or couple disc or knife contact surface 455 with contact member 435 and/or second sidewall 410. In various embodiments, an outside diameter of tire 400 at tapering portion 460 nearer contact area 445 is greater or larger than an outside diameter of tire 400 further from contact area 445 or toward disc or knife contact surface 455. Disc contact portion 450 may be provided on or near second sidewall 410 at an end portion of tapering portion 460 furthest from contact surface 445. In various embodiments, disc contact portion 450 includes an amount of tire material which extends or projects away from second sidewall 410. Further, in various embodiments, disc contact portion 450 projects away from hollow channel 465. In various embodiments, disc contact portion 450 and/or disc or knife contact surface 455 is adapted or configured to contact or nearly contact a disc or knife of a no-till seeder. Thus, in various embodiments, as seeder tire 400 rolls, disc or knife contact portion 450 and/or contact surface 455 provides a wiping or cleaning of material buildup on the disc or knife (e.g., during planting). In addition, it is not atypical for the tire material of disc contact portion 450 to wear away or decrease over a period of time of use, due to contact with the disc or knife or soil (e.g., during planting). Accordingly, in various embodiments, disc contact portion 450 is provided with sufficient material to allow for acceptable wear over time.

Hollow channel 465, bridging member 440, and contact member 435 thickness of tire 400 at or about contact surface 445 may help reduce stress points which could collapse, damage or otherwise modify tire 400 during its life or use, while helping maintain sufficient wear strength of the contact surface with the ground.

According to various embodiments, the present disclosure also includes a process of molding or rotationally molding a one-piece, one layer, tire or seeder tire. In various embodiments, the tire is substantially homogeneous. However, the tire may be comprised of multiple substantially homogeneous layers. The tire may also be comprised of one or more reinforced homogenous layers (e.g., reinforcing material provided within one or more homogeneous layers. The tire may be manufactured of any material, such as a synthetic material for example, during a molding process such as rotational molding. In this process a heated hollow mold is filled with a charge or shot weight of material. The tank is then slowly rotated (usually simultaneously around two perpendicular axes) causing the softened material to disperse and stick to the walls of the mold. To achieve optimal and relatively even thickness throughout the tire, in various embodiments, the mold continues to rotate at all times during the heating phase and to avoid sagging or deformation during the cooling phase. The rotational molding process may be a high-temperature, low-pressure plastic-forming process that uses heat and biaxial rotation (i.e., angular rotation on two or more axes) to produce hollow, one-piece parts. The disclosed process does have distinct advantages. Rotational molds are significantly cheaper than other types of molds. Very little material is wasted using this rotomolded process, and excess material can often be re-used, making it a very economically and environmentally viable manufacturing process.

The rotational molding process may include three phases:
1. Preparing and loading a measured quantity of synthetic material, such as a thermoset or thermoplastic polyurethane compound, or a mixture of a thermoset or thermoplastic polyurethane compound and one or more additives into a mold.
2. Rotating the mold (e.g., biaxially) at predetermined RPMs until the compound or mixture including the compound has sufficiently polymerized to retain the mold's shape. The mold may be heated and cooled during rotation.
3. Removal of the tire from the mold.

During the process, the air temperature and the internal pressure in the mold may be monitored, allowing the tire to be removed from the mold at a time to achieve desirable properties of the molded synthetic material.

The mold is typically clamped to a holding fixture, or spider, and mounted on rotational molding equipment. The rotational molding equipment simultaneously rotates the mold about a major and minor axis. In various embodiments, the mold is manufactured from silicone. Using the rotational molding equipment and a silicone back cast of a solid cross-section gauge wheel, tire 300/400 molded as a single or one-piece tire, or as one piece of rotationally molded material, may be produced. It should be appreciated, however, that the rotationally molded tire may include multiple pieces (e.g., half tires, quarter tires, etc.). In addition, it should be appreciated that the tire disclosed herein may be molded or otherwise produced in other ways such as blow molding.

By reducing the mass of the seeder tire relative to known solid tires through introduction of the self- or fully enclosed hollow channel, less material is necessary to manufacture improved seeder tire. This also advantageously allows for use of a urethane compound as the manufacturing material of which the seeder tire is made. The urethane compound is an engineered elastomer which typically has a higher cost than commercial elastomeric material used in known tires but may be made more affordable because of the overall reduction in needed material relative to known solid tires.

Tire 300, 400, according to various embodiments, is typically manufactured for or with one or more urethane compounds (e.g., thermoplastic and/or thermoset polyurethane). compounds. Polyurethane generally has a preferable hardness, tear strength, elasticity, and specific gravity as further described herein. In various embodiments, the tire material offers low surface energy, reducing mud and material deposit on the tire. In various embodiments, the material also may provide preferential wear characteristics for tire 300, 400 and expected or typical conditions.

In various embodiments, the polyurethane compound is a thermoset polyurethane. In various embodiments, the polyurethane compound is a thermoplastic polyurethane. The compound may be produced in a variety of ways (e.g., using a blocked catalyst, a blocked isocyanate, and/or a blocked curative system). In various examples of embodiments, the preferred polyurethane compound for use in seeder tire 300, 400 preferably has a hardness of approximately 80 to 100 Shore A, and more preferably approximately 93 Shore A. In addition, in various embodiments, the polyurethane compound preferably has a tear strength (in units of kN/m) using ASTM D-624 (Die C) of approximately 100 to 150 kN/m, and more preferably approximately 120 kN/m, and using ASTM D-1938 (Trouser Tear) of approximately 50 to 80 kN/m, and more preferably approximately 65 kN/m. In various embodiments, the polyurethane compound also preferably includes a 100% secant modulus of 10 to 13 MPa, and more preferably around 11.5 MPa. Further, in various embodiments, the cured molded part has a specific gravity of 1.2 to 1.4 g/cc, and more preferably around 1.3 gm/cc. In various embodiments, one or more other polyurethanes or other moldable products (e.g., polyolefin elastomers), or combinations thereof, such as a thermoplastic polyurethane may be utilized to produce the tire.

In one or more examples of embodiments of seeder tire 300, 400 disclosed herein, one or more additives may be introduced to the polyurethane(s) to adjust the surface energy. More specifically, one or more additives may be introduced to the polyurethane(s) to lower surface energy. Examples of such additives may include, but are not limited to, silicone polymers and/or fluoropolymers. An example of a commercially available silicone polymer includes DABCO DC sold by Air Products and Chemicals, Inc. of Allentown, PA. An example of a commercially available fluoropolymer includes DUPONT FLUOROGUARD sold by E. I. du Pont de Nemours and Company of Wilmington, DE.

In various embodiments, the polyurethane compound offers advantages over traditional materials used in solid tires. For example, the polyurethane compound may offer low surface energy which reduces material sticking to the tire thereby giving a cleaner and more consistent surface for placing seeds in furrows. In addition, the polyurethane compound may offer improved abrasion, cut, and tear resistance, improving the tire's longevity in applications particularly with genetically modified crops. Further, in various embodiments, the polyurethane compound offers improved wear characteristics for the seeder tire to work in contact with the steel disc or knife blade that produces the furrow for seed planting.

In one or more examples of embodiments of seeder tire 300, 400 disclosed herein, one or more additives may also be introduced to the polyurethane(s) to improve tear strength. Examples of such additives may include, but are not limited to, fiberglass, carbon fiber, or Kevlar. In various embodiments, the additive may comprise more than five percent but less than twenty percent of the tire compound.

The technical effects and technical problems in the specification are exemplary and are not limiting. It should be noted that the embodiments described in the specification may have other technical effects and can solve other technical problems and other advantages may also be obtained. For example, the tires in various examples of embodiments can more optimally meet or exceed the desired or known amount of wheel deflection and/or puncture resistant of various known wheels (e.g., gauge wheels).

The following nonexclusive examples illustrate features of the present invention:

Example 1

Testing was undertaken to better determine variation in deflection among a known Amerityre brand hollow rubber tire for a gauge wheel, and a known solid TDI ester polyurethane tire, having a hardness of 93 Shore A, and the disclosed hollow tire 400 according to various embodiments made using 3.5, 4, 4.5, and 5 pounds of MDI polycapolactone polyurethane material, having a hardness of 93 Shore A, respectively. This testing was also undertaken to better understand what material composition(s) may also help, hinder or prevent any excess mud packing on the gauge wheel tire outside diameters. From the test data, it was determined that varying (e.g., adding or subtracting) material used to make various embodiments of the disclosed tires can vary the desired amount of deflection. The varying cross-section and MDI polycapolactone material had acceptable deflection and great wear properties for the given application. An objective of the testing was to deflect various disclosed embodiments of hollow polyurethane gauge wheels and tires and compare the data to the "benchmark" hollow rubber gauge wheel and tire. The results of the testing also helped show which compound(s) or material(s) and cross section(s) will more optimally release packed on mud during operation.

In the testing, all gauge wheels and tires tested were bolted to an identical stamped plate split rim. The gauge wheels were then placed in an Instron brand compression testing apparatus and run through a deflection program. The deflection test parameters utilized are illustrated in Table 1. As indicated in Table 1, a limit was incorporated into the deflection program so that the Instron testing apparatus would discontinue compression if a tire were to exceed ¾" deflection or at 10,000 lbf. Due to the method of testing, the tire and wheel experienced deflection on the top and bottom surfaces. The values recorded were a combination of deflection amounts for both sides/surfaces.

TABLE 1

| Deflection Test Parameters | |
|---|---|
| Max. Deflection | ½" * |
| Incremental Deflection | .050" |
| Deflection Limit | ¾" |
| Load Limit | 10000 lbf. |

Using a known hollow rubber tire as a benchmark for testing, the disclosed hollow tire designs demonstrated deflection values during testing that ranged from greater to less than that of for the benchmark hollow rubber tire, indicating that deflection of various embodiments of the tire disclosed herein may be varied based on the amount of material used in making the tire as, for example, material amount differences help create different cross sections for the disclosed hollow design. (See FIG. 7).

Figure 7:
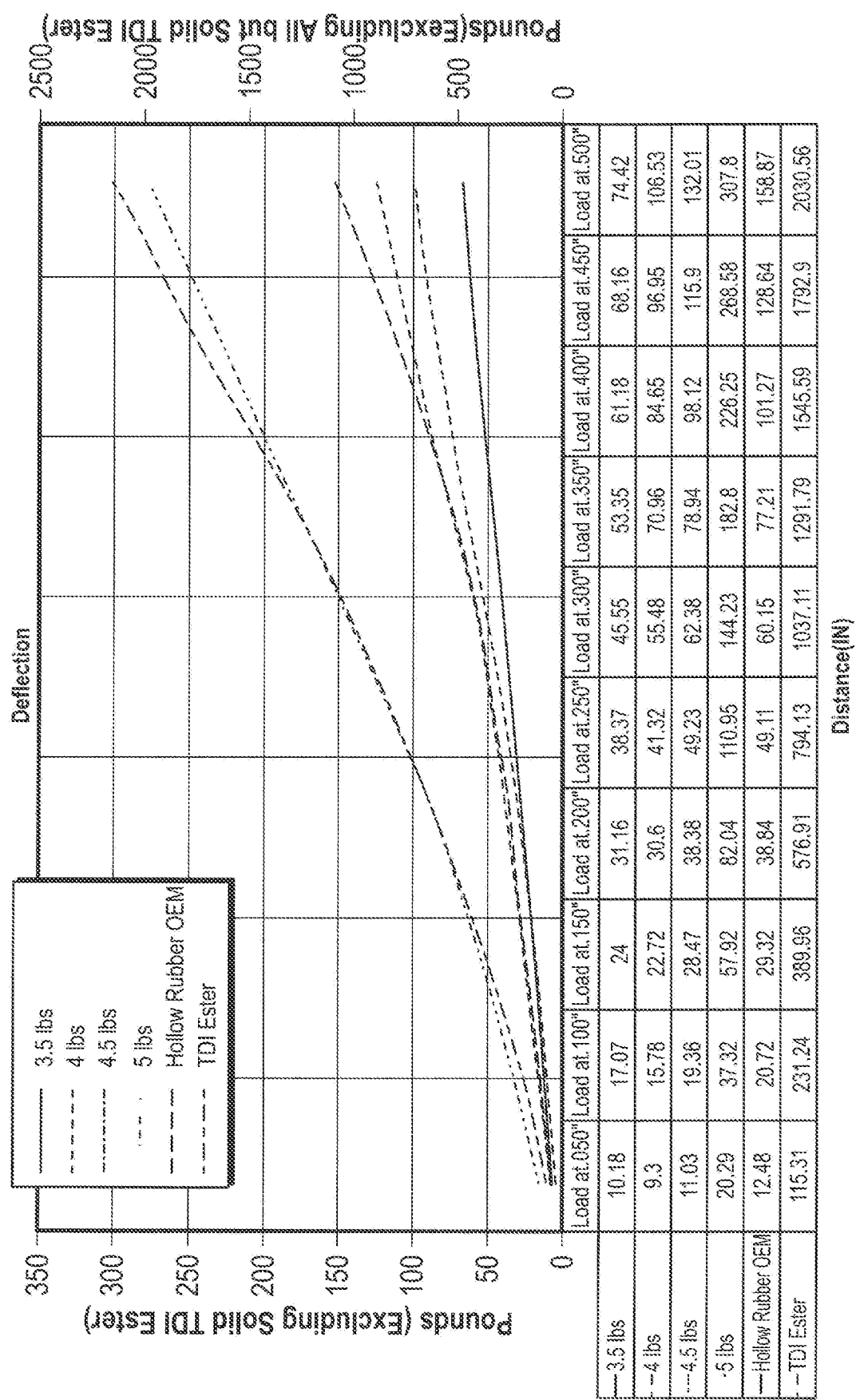
FIG. 7 illustrates a graph of deflection testing of known tires and disclosed tires, according to various examples of embodiments.

Based on this deflection testing, and as illustrated in FIG. 7, the 4.5 pound hollow tire disclosed herein tested comparable to the Amerityre brand hollow rubber tire with a difference of about only 26.86 lbf force. However, in the field, optimal or desired deflection tends to vary by application, and the tires and methods disclosed herein allow for tuning or adjustment of a tire's deflection as desired to produce a wheel that is more optimal for the user or application.

Example 2

Testing was also undertaken to better understand the amount of comparative force it may take to puncture various cross-sectioned gauge wheel tires, including known tires and disclosed embodiments. The testing was also undertaken to better understand how the disclosed embodiments of polyurethane gauge wheel tires and wheels compared to a known rubber Amerityre hollow gauge wheel and tire.

A hollow and a sharp-tipped device or fixture were each created to simulate a broken soy bean stalk, and separate tests were conducted with each. The hollow or cupped tip testing results indicated that the puncture resistance of the disclosed hollow tire designs exceeded that of the known rubber tire by about 50 pounds of force. The sharp tip test results indicated that, depending on the amount of material used in the disclosed tire design, the disclosed hollow tire designs were able to withstand about 5-20 pounds of force more than the known Amerityre brand hollow rubber tire tested. Both sets of testing results indicated that the disclosed hollow tires will last as long as or longer than known tires tested, under typical operating conditions.

The objective of the testing was to puncture various embodiments of the disclosed hollow polyurethane gauge wheel tires and compare the determined puncture resistance data to a known "benchmark" Amerityre brand hollow rubber gauge wheel tire. The results of the testing helped better determine which compound(s) and cross-section(s) would more optimally endure or otherwise function in no-till planting conditions.

The first step in the testing was to determine and set testing parameters. It was determined that one of the bigger concerns in typical gauge wheel application was soybean stalks puncturing and tearing the gauge wheel tires, as it drastically reduces the wear life of known gauge wheel tires. No-till planting is done over corn, soybean, and cotton stalks. All of these stalks in a no-till operation rapidly wear down known tires including the Amerityre brand rubber hollow gauge wheel tires.

For the testing, test devices or fixtures were designed and manufactured to simulate a soybean stalk. Because typical stalks in the field are either hollow or are left with a sharp point after harvesting, puncturing test devices were designed and created to simulate a hollow and a sharp stalk.

A base was also created on which to place the sample piece of gauge wheels was also prepared. The base used was a 2.5" inside diameter tube on which the parts sat for the testing. The height of the base was 1.75" and thickness of the base material was 0.25". Test pieces were cut from an Amerityre brand rubber gauge wheel, a known solid TDI ester polyurethane tire, and 3.5, 4, 4.5, 5 pound embodiments of the disclosed tire design made using MDI polycapolactone polyurethane. Except for the known solid TDI ester polyurethane tire piece, a "window" was cut in the inside diameter portion of each sample piece for testing the puncture resistance of the outside diameter portion of each sample.

After the sample pieces were prepared, the puncturing fixture and base were attached to the arm and base respectively of an Instron brand compressor testing apparatus. A program was developed for the Instron testing apparatus to incrementally press a test device into a sample piece and retract once peak load was reached. If the puncture device were to travel 1½", the program would have the arm retract to avoid damaging the test devices. The samples were placed on top of the base fixture, the puncturing device was manually lowered to the sample, and the Instron program was zeroed in order to calculate deflection depth. While the test program was running, materials deflection and puncturing were visible during the separate testing (e.g., using hollow & sharp devices).

Each sample was punctured three times during both tests and, from that, an average puncturing force was determined. While the sample was being punctured, the amount of deflection of the material at the moment of puncture was also recorded.

Figure 8:
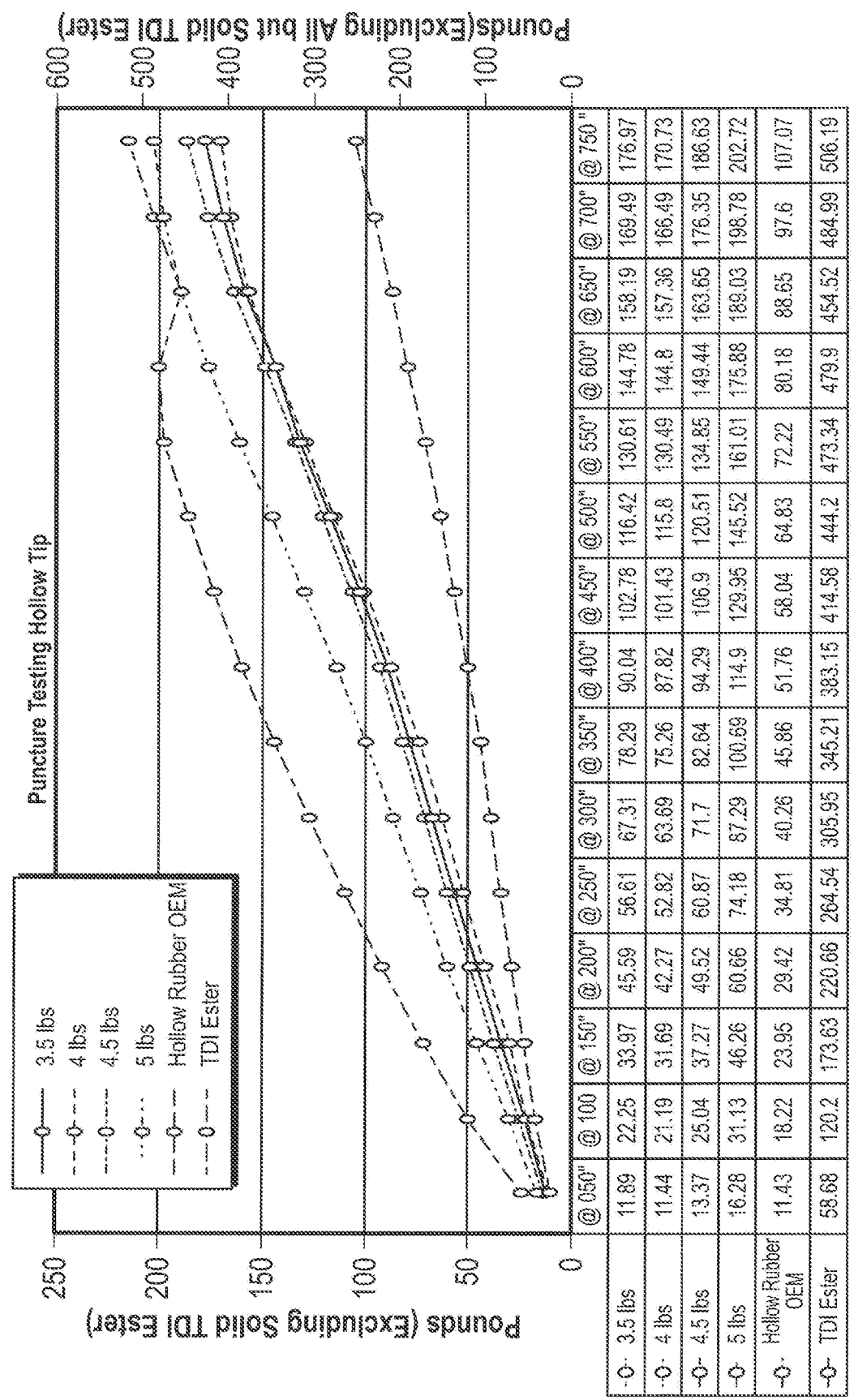
FIG. 8 illustrates a graph of hollow-tip puncture testing of known tires and disclosed tires, according to various examples of embodiments.
Figure 9:
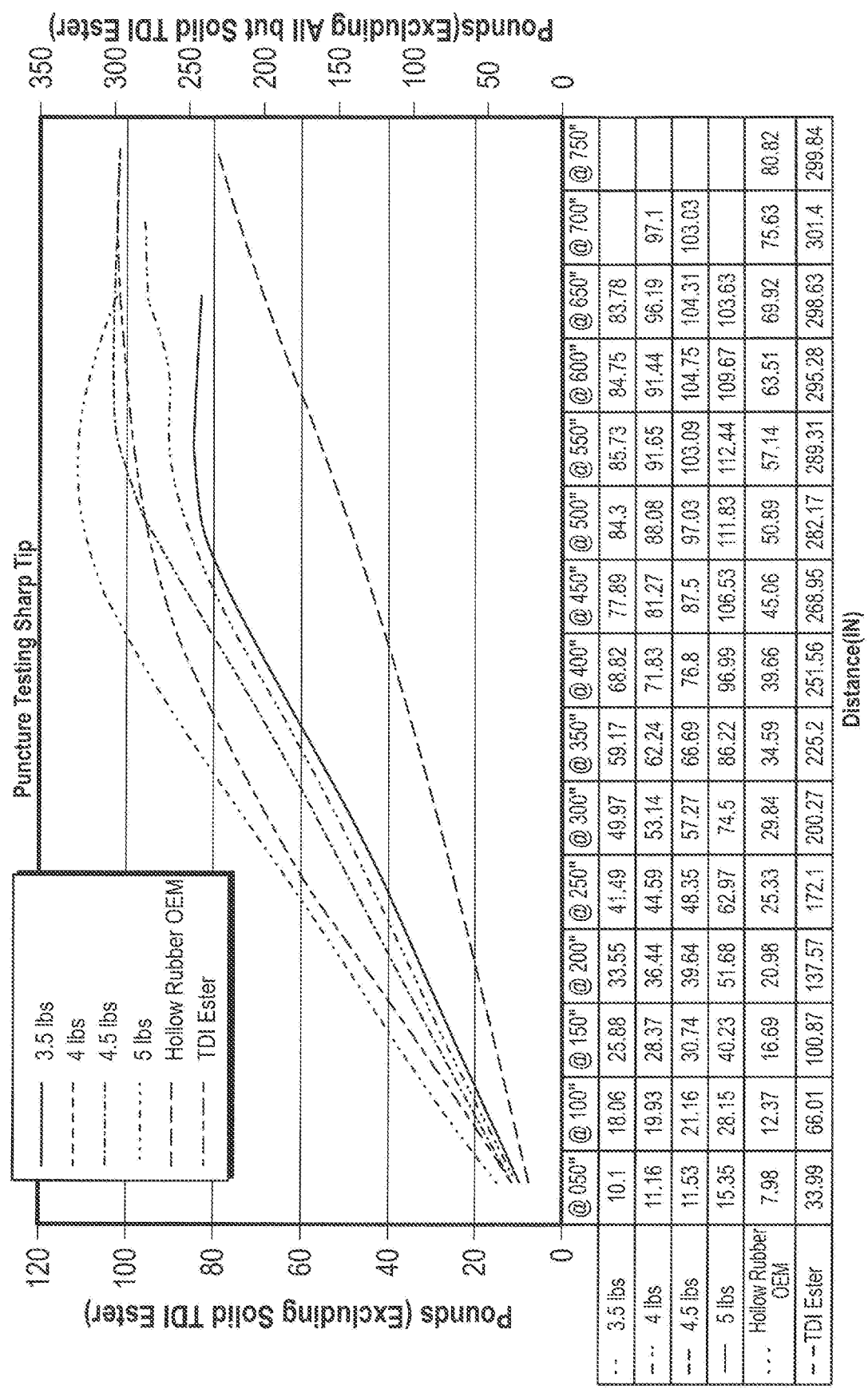
FIG. 9 illustrates a graph of sharp-tip puncture testing of known tires and disclosed tires, according to various examples of embodiments.

Referring now to FIG. 8, the hollow tip test resulted in the TDI ester polyurethane solid wheel taking the highest load before puncture (516.19 lbf), followed by the disclosed five-pound wheel (202.72 lbf). All tested disclosed tire embodiments absorbed or tolerated more force than the Amerityre brand rubber hollow tire before puncturing. Referring now to FIG. 9, the sharp-tip test resulted in the tested solid TDI ester polyurethane wheel taking the highest load before puncture, followed by the tested disclosed hollow tire embodiments which did not make the full 0.75" deflection but did require larger forces to puncture than the tested Amerityre brand rubber tire which failed at 80.82 lbf.

The results of the puncture testing indicated that the disclosed embodiments of hollow gauge wheel tires will more optimally withstand a no-till application compared to other known hollow tires. In addition, the puncture testing indicated that the disclosed embodiments of the hollow tires in a typical gauge wheel will tend to last as long if not longer than known Amerityre brand's hollow rubber tires.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied (e.g., by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

We claim:

1. A seeder tire comprising:
a first sidewall spaced apart from a second sidewall, whereby the first sidewall has a base portion and an opposing end and an L-shaped cross section between the base portion of the first sidewall and the opposing end of the first sidewall, and the second sidewall has a base portion and an opposing end and an L-shaped cross section between the base portion of the second sidewall and the opposing end of the second sidewall; a contact member extending from the opposing end of the first sidewall to the opposing end of the second sidewall; a bridging member extending from the base portion of the first sidewall to the base portion of the second sidewall; a central axis; and a sidewall structure extending outwardly away from the contact member and the second sidewall to a disc contact portion of the sidewall structure;
whereby the sidewalls, contact member and bridging member define a hollow channel;
whereby the L-shaped cross section of the second sidewall comprises a leg that continuously increases in cross-sectional thickness as it extends laterally away from the central axis; and
whereby the seeder tire has a homogeneous single-piece construction made of one or more polyurethane compounds.

2. A method of making the seeder tire of claim 1, whereby the seeder tire is formed by rotational molding of the one or more polyurethane compounds.

3. The tire of claim 1, whereby the one or more polyurethane compounds are one or more thermoset polyurethane compounds.

4. The tire of claim 1, whereby the one or more polyurethane compounds are one or more thermoplastic polyurethane compounds.

5. The tire of claim 1, whereby the first sidewall, second sidewall, contact member and bridging member have thicknesses ranging from 0.225 inches to 0.4 inches.

6. The tire of claim 1, whereby the first sidewall, second sidewall, contact member and bridging member have thicknesses ranging from 0.3125 inches to 0.4 inches.

7. A seeder tire comprising:
a first sidewall, a second sidewall, a contact member, a bridging member, a central axis; and a sidewall structure
whereby the first sidewall is spaced apart from the second sidewall, the first sidewall has a base end and an opposing end and an L-shaped cross section between the base end of the first sidewall and the opposing end of the first sidewall, and the second sidewall has a base end and an opposing end and an L-shaped cross section between the base end of the second sidewall and the opposing end of the second sidewall;
whereby a contact member connects the opposing end of the first sidewall to the opposing end of the second sidewall;
whereby the bridging member connects the base portion of the first sidewall to the base portion of the second sidewall;
whereby a sidewall structure extends from the contact member and the second sidewall, the sidewall structure having a disc contact portion;
whereby the sidewalls, contact member and bridging member define a hollow channel;
whereby the L-shaped cross section of the second sidewall comprises a leg that continuously increases in cross-sectional thickness as it extends laterally away from the central axis; and
whereby the seeder tire has a homogeneous single-piece construction made of one or more polyurethane compounds.

8. The tire of claim 7, whereby the one or more polyurethane compounds are one or more thermoset polyurethane compounds.

9. The tire of claim 7, whereby the first sidewall, second sidewall, contact member and bridging member have thicknesses ranging from 0.225 inches to 0.4 inches.

10. The tire of claim 9, whereby the first sidewall, second sidewall, contact member and bridging member have thicknesses ranging from 0.3125 inches to 0.4 inches.

* * * * *